United States Patent
Kalinowski et al.

(10) Patent No.: US 6,753,357 B2
(45) Date of Patent: Jun. 22, 2004

(54) RIGID FOAM COMPOSITIONS AND METHOD EMPLOYING METHYL FORMATE AS A BLOWING AGENT

(75) Inventors: Timothy T. Kalinowski, St. Charles, MO (US); David G. Keske, Glencoe, MO (US); Victor Matimba, Corinth, TX (US); David L. Modray, Kirkwood, MO (US); Mark Schulte, Moline Acres, MO (US)

(73) Assignee: Foam Supplies, Inc., Earth City, MO (US)

( * ) Notice: Subject to any disclaimer, the term of this patent is extended or adjusted under 35 U.S.C. 154(b) by 0 days.

(21) Appl. No.: 10/026,306

(22) Filed: Dec. 18, 2001

(65) Prior Publication Data

US 2003/0114549 A1 Jun. 19, 2003

(51) Int. Cl.[7] .................................................. C08J 9/06
(52) U.S. Cl. ...................... 521/130; 521/170; 521/172; 521/173; 521/174
(58) Field of Search ................................ 521/130, 170, 521/172, 173, 174

(56) References Cited

U.S. PATENT DOCUMENTS

| | | |
|---|---|---|
| 3,072,582 A | 1/1963 | Frost |
| 3,745,203 A | 7/1973 | Harper |
| 3,879,315 A | 4/1975 | Watkinson et al. |
| 4,033,910 A | 7/1977 | Papa |
| 4,448,951 A | 5/1984 | Rupert et al. |
| 4,945,119 A | 7/1990 | Smits et al. |
| 4,960,804 A | 10/1990 | Doerge |
| 4,972,003 A | 11/1990 | Grunbauer et al. |
| 4,997,858 A | 3/1991 | Jourquin et al. |
| 5,032,623 A | 7/1991 | Keske et al. |
| 5,118,720 A | 6/1992 | Wheeler et al. |
| 5,166,182 A | 11/1992 | Blanpied |
| 5,192,813 A | 3/1993 | Henn et al. |
| 5,194,175 A | 3/1993 | Keske et al. |
| 5,227,408 A | 7/1993 | Hanna et al. |
| 5,274,007 A | 12/1993 | Keske et al. |
| 5,283,003 A | 2/1994 | Chen |
| 5,336,696 A | 8/1994 | Ashida |
| 5,405,885 A | 4/1995 | Sampara et al. |
| 5,424,338 A | 6/1995 | Krueger |
| 5,429,066 A | 7/1995 | Lewit et al. |
| 5,439,948 A | 8/1995 | De Vos et al. |
| 5,464,880 A | 11/1995 | Weber et al. |
| 5,488,072 A | 1/1996 | Green |
| 5,532,284 A | 7/1996 | Bartlett et al. |
| 5,597,885 A | 1/1997 | Lutter et al. |
| 5,604,265 A | 2/1997 | De Vos et al. |
| 5,631,319 A | 5/1997 | Reese et al. |
| 5,660,926 A | 8/1997 | Skowronski et al. |
| 5,664,518 A | 9/1997 | Lewit et al. |
| 5,686,500 A | 11/1997 | Fishback et al. |
| 5,710,185 A | 1/1998 | Volkert et al. |
| 5,731,361 A | 3/1998 | Horn et al. |
| 5,739,173 A | 4/1998 | Lutter et al. |
| 5,760,099 A | 6/1998 | Horn et al. |
| 5,763,502 A | 6/1998 | Barker et al. |
| 5,770,635 A | 6/1998 | Lee et al. |
| 5,786,401 A | 7/1998 | Inagaki et al. |
| 5,800,749 A | 9/1998 | Lewit et al. |
| 5,801,210 A | 9/1998 | Radovich et al. |
| 5,883,146 A | 3/1999 | Tucker |
| 5,908,591 A | 6/1999 | Lewit et al. |
| 5,922,348 A | 7/1999 | Wegner |
| 6,013,213 A | 1/2000 | Lewit et al. |
| 6,031,013 A * | 2/2000 | Scherzer et al. ............ 521/174 |
| 6,034,145 A | 3/2000 | Cornet et al. |
| 6,034,148 A | 3/2000 | Kelly et al. |
| 6,046,247 A | 4/2000 | Gluck et al. |
| 6,087,409 A | 7/2000 | Naber et al. |
| 6,107,355 A | 8/2000 | Horn et al. |
| 6,133,481 A | 10/2000 | Singh et al. |
| 6,207,725 B1 | 3/2001 | Sieker et al. |
| 6,235,806 B1 | 5/2001 | Ohga et al. |
| 6,319,962 B1 | 11/2001 | Singh et al. |
| 6,384,098 B1 | 5/2002 | Suk et al. |

(List continued on next page.)

FOREIGN PATENT DOCUMENTS

| | | |
|---|---|---|
| DE | 2429090 | 4/1975 |
| EP | 355872 A1 | 2/1990 |
| EP | 355874 A1 | 2/1990 |
| EP | 657495 B1 | 6/1995 |
| JP | 2302448 A | 12/1990 |
| JP | 06-306132 | 1/1994 |

OTHER PUBLICATIONS

Modesti, M., et al., *Chemical and Physical Blowing Agents in Structural Polyurethane Foams: Simulation and Characterization*; Polymer Engineering and Science, Sep. 2000, vol. 40, No. 9, pps. 2046–2057.

Doerge, H. P., et al., *CFC AND HCFCs In Mixtures with Organic Liquids as Blowing Agents for Rigid Foams*, 33rd Annual Polyurethane Technical/Marketing Conference, Sep. 30–Oct. 3, 1990, pp. 82–89.

Moskowitz, Marcie, *Suppliers prepare for a future without CFCs*, Plastics World, Mar. 1991, pps. 93–95.

*Blowing agents: Suppliers Gear Technology For A CFC–Free Industry By 2000*, Modern Plastics International, Oct. 1990, pps. 90–92.

Primary Examiner—John M. Cooney, Jr.
(74) Attorney, Agent, or Firm—Sonnenschein Nath & Rosenthal LLP

(57) ABSTRACT

A method for producing a rigid, closed-cell polyurethane foam having a free-rise density of from about 1.3 lbs./ft.$^3$ to about 4 lbs./ft.$^3$ and exhibiting a shrinkage of less than 10%, comprises mixing together an isocyanate, a methyl formate blowing agent and at least one polyol having a hydroxyl number of from about 150 to about 800 and being selected from the group consisting of polyalkoxylated amines, polyalkoxylated ethers, and polyester polyols, to form a reaction mixture that is curable to produce such foam.

28 Claims, No Drawings

U.S. PATENT DOCUMENTS

| | | |
|---|---|---|
| 6,403,665 B1 | 6/2002 | Sieker et al. |
| 6,410,609 B1 | 6/2002 | Taylor et al. |
| 6,420,443 B1 | 7/2002 | Clark et al. |
| 6,420,448 B1 | 7/2002 | Hnatow et al. |
| 6,423,755 B1 | 7/2002 | Allen et al. |
| 6,433,031 B1 | 8/2002 | Ramael |
| 6,472,449 B1 | 10/2002 | Heinemann et al. |
| 2001/0036974 A1 | 11/2001 | Wu et al. |
| 2002/0086913 A1 | 7/2002 | Roels et al. |
| 2002/0120029 A1 | 8/2002 | Dohmoto et al. |

* cited by examiner

RIGID FOAM COMPOSITIONS AND METHOD EMPLOYING METHYL FORMATE AS A BLOWING AGENT

BACKGROUND OF THE INVENTION

1. Field of the Invention

The present invention relates to rigid polyurethane foams, and more particularly to the preparation of such foams with methyl formate as the sole or primary blowing agent.

2. Description of the Prior Art

Rigid polyurethane foams are useful in a wide range of applications, including applications for insulation in refrigeration systems, structural applications and flotation applications, as in boats, buoys, docks and other flotation devices. In such applications, not only the density and closed cell content of the foam, but also the ability of the foam to retain its dimensional stability in adverse conditions are critical. In fact, in flotation applications, the United States government has specified rigorous test methods and standards for such characteristics of foams in relevant applications associated with the United States Coast Guard. See, for example, 33 CFR §183.114 and the test methods set forth in ASTM D2126.

Conventionally, processes employing two components or three components have been used to prepare rigid foams. One component, generally referred to as component A (or A-side), comprises isocyanate. Frequently, component A also comprises a surfactant and a blowing agent. The second component, known generally as component B (or B-side), comprises any of various polyols, particularly polyether and/or polyester polyols. Component B may also comprise a surfactant, a catalyst package and a blowing agent, any or all of which may reside solely in component B. Alternatively, any or all of such ingredients may be introduced to the reaction mixture in a third stream or in both component B and a third stream. If an excess of isocyanate is employed, modified polyisocyanurate foams may be formed. The foams produced by these standard methods commonly have a density in the range of from about 1 lb./ft.$^3$ to about 4 lb./ft.$^3$, have a closed cell content on the order of about 85% and have low friability characteristics.

Ordinarily, the polyols are poly-functional; that is, the polyol molecule has two or more branches, which provide linking sites for cross-polymerization. Historically, the blowing agent is or at least includes one or more chlorofluorocarbon (CFC), often in combination with water. However, CFCs have been the subject of environmental concern in view of the deleterious effects that they have been reported to have on the earth's ozone layer. Therefore, it is desirable to avoid use of CFCs and the industry for many years has been searching for viable alternative blowing agents suitable for preparation of rigid polyurethane foam.

Certain processes that employ HCFCs in place of CFCs have been reported. For example, U.S. Pat. Nos. 5,032,623, 5,194,175 and 5,274,007 describe a process by which an HCFC, monochlorodifluoromethane (CHClF$_2$), can replace traditional CFCs in the preparation of rigid foams. However, even HCFCs, while markedly better than CFCs in terms of deleterious environmental effects, still are associated with environmental risks and so it is optimal if even their use is avoided.

Attempts at the use of methyl formate as an alternative blowing agent have been reported, but those attempts have been unsuccessful in that the produced foams that have been produced with methyl formate as the primary or sole (other than, perhaps, water) blowing agent are unsatisfactory. In particular, it has been found that such foams have a foam shrinkage of more than 10% and so demonstrate poor dimensional stability. See, for example, U.S. Pat. No. 5,283,003 to Chen. Thus, use of methyl formate as a blowing agent has been reported to produce a dimensionally stable foam only when used in combination with a substantial amount of one or more additional blowing agents such as organic or even hydrocarbon or traditional CFC or HFC types of blowing agents. According to the U.S. Pat. No. 5,283,003 to Chen, methylene chloride and/or five-carbon hydrocarbons (e.g., n-pentane, isopentane, and/or cyclopentane) blowing agents must make up at least about 20% by weight of the total blowing agent combination. U.S. Pat. No. 5,883,146 to Tucker describes the use of formic acid (or a salt thereof) as a blowing agent, but only in combination with a $C_1$ to $C_4$ hydrofluorocarbon. Although the patent to Tucker does not define the necessary relative proportions of the formic acid (or salt thereof) and the hydrofluorocarbon, the exemplification show that the hydrofluorocarbon must make up at least about half the blowing agent combination by weight.

Accordingly, the rigid foam industry is still searching for methods and compositions that would enable methyl formate or a related compound to be used as a blowing agent that can produce a rigid foam that meets the standards for such foams, but without the need for other organic blowing agents. Such standards include not only those relating to density and closed cell content, but also those relating to dimensional stability (resistance to shrinkage) as well.

SUMMARY OF THE INVENTION

Briefly, therefore, the present invention is directed to a novel method for producing a rigid, closed-cell polyurethane foam having a free-rise density of from about 1.3 lbs./ft.$^3$ to about 4 lbs./ft.$^3$ and exhibiting a shrinkage of less than 10%. According to the method, an isocyanate, a blend of polyols of hydroxyl numbers of from about 150 to about 800, and a methyl formate (and/or derivative and/or precursor thereof) blowing agent are mixed together to form a reaction mixture that produces the foam. The blend of polyols in which at least 50% by weight is made up of at least one polyol having a hydroxyl number of from about 150 to about 800 and being selected from the group consisting of polyalkoxylated amines, polyalkoxylated ethers, and polyester polyols.

The present invention is also directed to a novel reaction mixture that can react to form a rigid, closed-cell polyurethane foam having a free-rise density of from about 1.3 lbs./ft.$^3$ to about 4 lbs./ft.$^3$ and exhibiting a shrinkage of less than 10%. The reaction mixture comprises the isocyanate, the blend of polyols, and the methyl formate (and/or derivative and/or precursor thereof) blowing agent described above.

The present invention is also directed to a novel rigid, closed-cell polyurethane foam having a free-rise density of from about 1.3 lbs./ft.$^3$ to about 4 lbs./ft.$^3$ and exhibiting a shrinkage of less than 10%, comprising cells containing gas, at least about 40% by weight of the gas being a combination of methyl formate and carbon dioxide.

Among the several advantages found to be achieved by the present invention, therefore, may be noted the provision of a method for preparation of rigid foam of high dimensional stability in which standard CFC, HCFC, HFC and hydrocarbon blowing agents are not needed; the provision of such method in which no standard organic blowing agent other than methyl formate is needed; the provision of a reaction mixture that does not include CFC, HCFC, HFC or hydrocarbon blowing agents, but still can produce such foams; the provision of such CFC-free, HCFC-free and HFC-free foams themselves; and the provision of such foams suitable for use as a flotation foam in watercraft, as a structural foam or as an insulation foam.

DESCRIPTION OF THE PREFERRED EMBODIMENTS

In accordance with the present invention, it has been discovered that methyl formate (or a derivative and/or precursor thereof) can be used as a blowing agent without the need for any other organic blowing agents to produce a rigid, closed-cell polyurethane foam having a free-rise density of from about 1.3 lbs./ft.$^3$ to about 4 lbs./ft.$^3$ and exhibiting a shrinkage of less than 10% if the combination of polyols with which the isocyanate is mixed to produce the foam comprises a blend of polyols in which at least 50% by weight is made up of at least one polyalkoxylated amine polyol, polyalkoxylated ether polyol, or polyester polyol having a hydroxyl number of from about 150 to about 800. The foams so produced have been found to be surprisingly stable dimensionally and may be used in essentially any industry in which rigid foams are employed, including uses as insulation in refrigeration systems, as structural components and for floatation. This method may be used to produce all types of rigid foams derived from isocyanate, including rigid polyurethane, polyisocyanurate and modified polyisocyanurate foams, such foams being referred to herein generically as polyurethane foams.

According to a two-component method of this invention in which a component A is mixed with a component B, component A comprises an isocyanate and, preferably also a surfactant. The isocyanate may be any of the isocyanates conventionally used in the production of rigid foams. Thus, any of the polyfunctional isocyanates, such as diphenylmethane-4,4-diisocyanate, xylylene diisocyanates, polymethylenepolyphenylisocyane, 3,3-diphenyldimethylmethane-4,4-diisocyanate, 2,4-toluenediisocyanate dimer, m-phenylenediisocyanate, toluene diisocyanates, diphenylmethane-2,4-diisocyanate, or mixtures thereof, may be used. Similarly, any conventional surfactant may be incorporated into component A, if so desired. Examples of such surfactants include silicones, such as B8407 sold by Goldschmidt Chemical Corp. or non-reactive polymers have been found to be particularly suitable. Other compositions, such as an acid formation inhibitor (for example, alphamethylstyrene) or a fire retardant, such as those containing bromine, chlorine or phosphorus, may also be included in the component A.

In addition, component A may, but need not, contain blowing agent to be employed in the foaming process. Methyl formate is the preferred blowing agent; however, it is also contemplated that a derivative and/or precursor of methyl formate may be used in place of some or all of the methyl formate. Thus, when reference is made herein to "methyl formate (and/or a derivative and/or precursor thereof)," it should be understood that methyl formate is preferred, although one or more derivative and/or precursor, or a combination of methyl formate and one or more derivative and/or precursor may be employed. By "derivative and/or precursor" of methyl formate, what is meant is any composition in which methyl formate is attached to a carrier, such as a gas, that is inert with respect to the remaining ingredients of components A and B. Thus, the derivative and/or precursor of methyl formate maintains the formate functionality. Preferably, if a methyl formate derivative and/or precursor is used, it is a complex that maintains the entire methyl formate structure as a moiety of the complex. By "precursor" of methyl formate, what is meant is a composition that produces methyl formate at some point prior to or during the foaming process.

It is also possible for small amounts of other compositions that act as blowing agents to be present. For example, CFCs, HCFCs, HFCs, methylene chloride, fluorocarbons, hydrofluorocarbons, hydrocarbons or other organic compounds may be present that act as blowing agents. However, if such compositions are present, they should total less than 20%, preferably less than 10%, more preferably less than about 5%, especially less than about 2%, of the total weight of blowing agents in component A. Ideally, however, component A is free of such compositions.

The materials of component A may be blended in any standard manner. The order of blending is not particularly significant. Nevertheless, a convenient order of mixing is to add surfactant to isocyanate, and then to add the acid inhibitor, if any, and finally to add the blowing agent(s), if any.

The relative proportions of ingredients should be such that if component A contains one or more blowing agent, the concentration of blowing agent(s) in component A is from about 0.5% by weight to about 12% by weight, preferably about 2% by weight to about 10% by weight. The methyl formate (and/or derivative and/or precursor thereof) itself may make up as much as about 12% by weight, preferably as much as about 10% by weight, such as from about 2% by weight to about 10% by weight, of component A. The surfactant may make up less than about 2% by weight, preferably about 0.75% by weight, of component A. If an acid inhibitor is desired, it may be included in a concentration of up to about 0.5% by weight, based on the weight of component A. Typically, the balance of component A is the isocyanate.

As with component A, the ingredients of component B may be mixed in any order. Component B contains at least one polyol. The total of all polyols in component B makes up from about 65% by weight to about 98% by weight, preferably about 86% by weight to about 92% by weight component B. At least one of the polyol(s) in component B is a polyalkoxylated amine, a polyalkoxylated ether or a polyester polyol and has a hydroxyl number of from about 150 to about 800. Preferably, the hydroxyl number is from about 300 to about 700, most preferably about 300 to about 500. The polyalkoxylated polyols preferably are alkoxylated with alkoxy groups of from two to about four carbon atoms; that is, they are polyethoxylated, polypropoxylated, polybutoxylated or some combination thereof. Those of ordinary skill in the art of rigid foam preparation will readily recognize suitable polyols that correspond to each of the types of polyols described. By way of illustration and not limitation, however, the polyalkoxylated amine may be, for example, a polyalkoxylated aliphatic amine or a Mannich polyol, the polyalkoxylated ether may be, for example, a polyalkoxylated sucrose or glycerin, and the polyester polyol may be a transesterification of a terephthalate or castor oil. The polyols can be made individually or as coinitiators.

Component B may comprise one or more of the noted polyalkoxylated amine, one or more of the noted polyalkoxylated ether, one or more of the noted polyester polyol, one or more of the noted polyalkoxylated amine in combination with one or more of the noted polyalkoxylated ether and/or one or more of the noted polyester polyol, or one or more of the noted polyalkoxylated ether in combination with one or more of the noted polyester polyol. In other words, one or more of any one of the three noted classes of polyols, or any combination of polyols from any two or all three of the classes may be employed. Component B may comprise other polyols as well, especially those traditionally employed in rigid foams, but preferably, the total of all polyols present from the three classes (that is, the total of all polyols from any of the noted polyalkoxylated amines, polyalkoxylated ethers and polyester polyols) make up more than about 50% by weight of all the polyols of component B, and at least about 50% by weight of component B.

As will be readily understood by those of ordinary skill in the art of producing rigid foams upon reading this specification, the types and quantities of each polyol are determined by the ratio of methyl formate to water in the formula and the desired properties of the finished foam, and such ordinarily skilled artisan would recognize preferred quantities and ratios of polyols that would be preferred for a particular situation, and how to adjust the quantities and ratios for coordination and optimization for particular situations without undue experimentation.

It also should be understood that the polyols in the combination need not form a separate composition package to be added as a single ingredient to form component B. Thus, it is not necessary to mix the three constituents of the mixture together to form a premix and then to form component B by mixing the premix with the remaining ingredients of component B, although that is an option. The ingredients of component B may be mixed in any order, and the polyols may be added separately from each other as separate ingredients to form component B.

Component B also comprises up to about 5% by weight, preferably from about 0.5% by weight to about 4% by weight, more preferably from about 1% by weight to about 3% by weight, water. The water is understood to serve not only as a blowing agent but to add rigidity to the resulting foam.

Component B further comprises methyl formate (and/or derivative and/or precursor thereof) as a blowing agent. The methyl formate (and/or derivative and/or precursor thereof) itself makes up as much as about 15% by weight, preferably from about 2% by weight to about 15% by weight, of component B.

Of course, the methyl formate (and/or derivative and/or precursor thereof) may be introduced by a separate stream in addition or in place of that which may be in either or both of components A and B. The concentrations of methyl formate (or derivative and/or precursor thereof) in components A and B and the amount introduced to the reaction mixture by way of a separate stream are adjusted and coordinated so that the resulting concentration of total methyl formate (or derivative and/or precursor thereof) brought together upon mixing components A and B and separate streams, if any, based on the total weight of the resulting mixture is from about 1% by weight to about 12%, preferably from about 4% by weight to about 8%. Other blowing agents may be employed or at least present, but it is preferred that the total amount of blowing agent(s) present in each component and in the total combination of all ingredients mixed together to form a foaming mixture to be blown to form a rigid foam comprise less than 20% by weight, preferably less than 10%, more preferably less than about 5%, especially less than about 2%, by weight CFCs, HCFCs, HFCs fluorocarbons and hydrocarbons. More preferably, however, the total amount of blowing agent(s) present in each component and in the total combination of all ingredients mixed together to form a foaming mixture should be substantially free of (that is, it should comprise less than 1% by weight) CFCs, HCFCs, HFCs, fluorocarbons and hydrocarbons. Even more preferably, the total amount of blowing agent(s) present in each component and in the total combination of all ingredients mixed together to form a foaming mixture to be blown to form a rigid foam should be free of CFCs, HCFCs, HFCs fluorocarbons and hydrocarbons. It is especially desirable if the total amount of blowing agent(s) present in each component and in the total combination of all ingredients mixed together to form a foaming mixture to be blown to form a rigid foam is also substantially free of (that is, contains less than about 1% by weight) of any other substituted or unsubstituted hydrocarbon, and particularly free of any other substituted or unsubstituted hydrocarbons. Ideally, the total amount of blowing agent(s) present in each component and in the total combination of all ingredients mixed together to form a foaming mixture to be blown to form a rigid foam is substantially free of any other organic compound that acts as a blowing agent, optimally free of such organic compounds. When reference is made herein to "other" compounds such as "other organic compounds," what is meant is compounds other than the methyl formate and/or derivative and/or precursors thereof.

Component B may also contain other ingredients as desired. Those of ordinary skill in the art will readily recognize several types of ingredients known for use in rigid foam formulations and those may be employed in the present invention as well. For example, a fire retardant such as those containing bromine, chlorine or phosphorus may be incorporated into the mixture to impart fire resistance. Other commonly used additives are hydroxyl-containing compositions such as castor oil, aromatic polyesters, glycols and/or alkoxylated sorbitals.

Component A and component B may be mixed, such as through a static mix chamber or any other such device commonly known in the industry, by standard procedures to produce a homogeneous blend. As with conventional foams, the isocyanate and the polyol(s) in the blend are allowed to react together and to expand to form rigid foam. The method of this invention may be used to produce low density and standard density as well as high-density foams. Component A and component B are mixed in a relative proportion such that the ratio of the cyano groups of component A to the hydroxyl groups of component B, that is, the NCO/OH ratio or index, is generally from about 0.8:1 to about 3:1. With respect to polyurethane foams, the weight ratio of Component A to Component B is generally within the range from about 150:100 to about 100:150, preferably to about 100:80–100:120. Polyisocyanurate foams may be produced when the NCO/OH ratio is in the range of from about 2:1 to about 3:1, such as about 2.5:1.

The rigid foam produced by the method of this invention has a low CFC, HCFC and HFC content and, if so desired, a low content of any fluorocarbon or substituted or unsubstituted hydrocarbon other than methyl formate. In fact, if so desired, the foam may have a low level of any organic compound other than methyl formate. The foam may even be free of any such compositions. Yet, the foam still has a closed cell content of at least 85%, and typically well in excess of 85%.

Preferably the gas in the cells of foam, therefore, contain more than 40% by weight $CO_2$ and methyl formate (and/or derivative and/or precursors thereof), more preferably more than about 90% by weight, still more preferably more than about 95% by weight, even more preferably more than about 98% by weight, and most preferably more than about 99% by weight or even about 100% by weight. In particular, because the method of this invention does not require any organic blowing agent in addition to the methyl formate, the level of other blowing agents and gases in the foam may be set at any low level desired and even may be eliminated entirely. Thus, by way of example, the gas in the cells may contain less than 20% by weight CFCs, HCFCs and HFCs and, as desired, less than 10%, less than 5% or even less than 1 or 2% by weight CFCs, HCFCs and HFCs. Likewise, the other substituted hydrocarbons or even other organic compounds may be similarly limited. Although rigid foams of free-rise density as high as 4 lb./ft.$^3$ may be acceptable in certain uses, the foams of this method have densities even lower, such as about 2.5 lb./ft.$^3$ to about 4 lb./ft.$^3$, preferably about 1.3 lb./ft.$^3$ to about 4 lb./ft.$^3$, especially about 1.3 lb./ft.$^3$ to about 2.5 lb./ft.$^3$.

Moreover, surprisingly, the foams of the present invention exhibit excellent dimensional stability, easily sufficient to satisfy standards requiring less than 10% shrinkage by volume pursuant to the test methods of ASTM-D2126. (When shrinkage is referred to herein, it refers to the volumetric shrinkage pursuant to those test standards.) Thus, the foams of this invention may be used in those applications that require compliance with 33 CFR §183.114.

It is intended that the specification be considered exemplary only, with the scope and spirit of the invention being indicated by the claims which follow. In view of the above, it will be seen that the several advantages of the invention are achieved and other advantageous results attained. As various changes could be made in the above methods and compositions without departing from the scope of the invention, it is intended that all matter contained in the above description shall be interpreted as illustrative and not in a limiting sense.

What is claimed is:

1. A method for producing a rigid, closed-veil polyurethane foam having a free-rise density of from about 1.3 lbs./ft.$^3$ to about 4 lbs./ft.$_3$ and exhibiting a shrinkage of less than 10%, comprising mixing together:
   (a) an isocyanate,
   (b) at least one polyol having a hydroxyl number of from about 150 to about 800 and being selected from the group consisting of polyalkoxylated amines, polyalkoxylated ethers, and polyester polyols, wherein all of said at least one polyols make up from 50% by weight to 100% by weight of all polyols in the reaction mixture; and
   (c) at least one blowing agent selected from the group consisting of methyl formate, derivatives of methyl formate, precursors of methyl formate, and combinations thereof, wherein all of said at least one blowing agents make up more than about 80% by weight of all blowing agents in the reaction mixture;
   to form a reaction mixture curable to produce the foam.

2. A method as set forth in claim 1, further comprising the step of reacting the isocyanate and the at least one polyol in the reaction mixture to produce the foam.

3. A method as set forth in claim 2, wherein the at least one blowing agent is methyl formate.

4. A method as set forth in claim 3, wherein the method comprises mixing together (a), (b), (c) and water as a second blowing agent to form the reaction mixture.

5. A method as set forth in claim 3, wherein methyl formate makes up more than about 90% by weight of all blowing agents in the reaction mixture.

6. A method as set forth in claim 5 wherein methyl formate makes up more than about 95% by weight of all blowing agents in the reaction mixture.

7. A method as set forth in claim 4 wherein methyl formate and water together make up more than about 90% by weight of all blowing agents in the reaction mixture.

8. A method as set forth in claim 7 wherein methyl formate and water together make up more than about 95% by weight of all blowing agents in the reaction mixture.

9. A method as set forth in claim 8 wherein methyl formate and water together make up more than about 98% by weight of all blowing agents in the reaction mixture.

10. A method as set forth in claim 4 wherein CFCs, HCFCs and HFCs together make up less than about 20% by weight of the blowing agents in the reaction mixture.

11. A method as set forth in claim 10 wherein organic compounds other than methyl formate make up less than about 20% by weight of the blowing agents in the reaction mixture.

12. A method as set forth in claim 10 wherein organic compounds other than methyl formate make up less than about 2% by weight of the blowing agents in the reaction mixture.

13. A method as set forth in claim 11 wherein the reaction mixture is free of CFCs, HCFCS and HFCs.

14. A method as set forth in claim 13 wherein the reaction mixture is free of substituted and unsubstituted hydrocarbon blowing agents other than methyl formate.

15. A method as set forth in claim 13 wherein the reaction mixture is free of organic blowing agents other than methyl formate.

16. A method as set forth in claim 4 wherein the methyl formate and water are the only blowing agents in the reaction mixture.

17. A reaction mixture curable to form a rigid, closed-cell polyurethane foam having a free-rise density of from about 1.3 lbs./ft.$^3$ to about 4 lbs./ft.$^3$ and exhibiting a shrinkage of less than 10%, comprising:
   (a) an isocyanate,
   (b) at least one polyol having a hydroxyl number of from about 150 to about 800 and being selected from the group consisting of polyalkoxylated amines, polyalkoxylated ethers, and polyester polyols, wherein all of said at least one polyols making up from 50% by weight to 100% by weight of all polyols in the reaction mixture, and
   (c) at least one blowing agent selected from the group consisting of methyl formate, derivatives of methyl formate, precursors of methyl formate, and combinations thereof, wherein all of said at least one blowing agents make no more than about 80% by weight of all blowing agents in the reaction mixture.

18. A reaction mixture as set forth in claim 17 wherein the at least one blowing agent is methyl formate.

19. A reaction mixture as set forth in claim 18, further comprising water as a second blowing agent.

20. A reaction mixture as set forth in claim 17, consisting essentially of:
   (a) an isocyanate,
   (b) at least one polyol having a hydroxyl number of from about 150 to about 800 and being selected from the group consisting of polyalkoxylated amines, polyalkoxylated ethers, and polyester polyols, wherein all of said at least one polyols make up from 50% to 100% by weight of all polyols in the reaction mixture;
   (c) from 0% to about 50% by weight of at least one other polyol, and (d) at least one blowing agent selected from the group consisting of methyl formate, derivatives of methyl format, precursors of methyl formate, and combinations thereof, wherein all of said at least one blowing agents make up more than about 80% by weight of all blowing agents in the reaction mixture.

21. A reaction mixture as set forth in claim 20 wherein the blowing agent is methyl formate.

22. A reaction mixture as set forth in claim 21, further comprising water that acts as a second blowing agent.

23. A rigid, closed-cell polyurethane foam having a free-rise density of from about 1.3 lbs./ft.$^3$ to about 4 lbs./ft.$^3$ and exhibiting a shrinkage of less than 10%, produced by the method of claim 2.

24. A foam as set forth in claim 23 wherein the gas is free of CFCs, HCFCs, HFCs and hydrocarbons.

25. A foam as set forth in claim 23 wherein the foam is suitable for use as a flotation foam.

26. A foam as set forth in claim 23 wherein the foam is suitable for use as structural foam.

27. A foam as set forth in claim 23 wherein the foam is suitable for use as an insulation foam.

28. A watercraft comprising a foam as set forth in claim 25.

* * * * *